Oct. 25, 1955 L. P. FRIEDER ET AL 2,721,712
CLOSURE AND LOAD ATTACHING UNIT FOR BALLOONS AND THE LIKE
Original Filed July 12, 1949 2 Sheets-Sheet 1
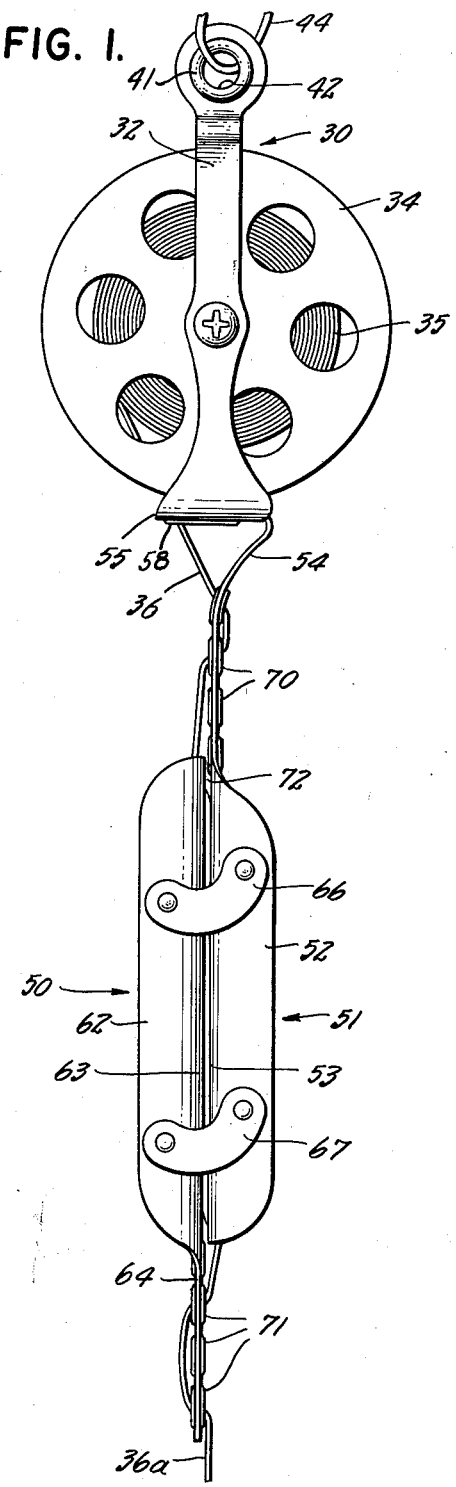
INVENTORS.
LEONARD P. FRIEDER
WALTER S. FINKEN
BY
Robert D. Dunham
ATTORNEY.

Oct. 25, 1955     L. P. FRIEDER ET AL     2,721,712
CLOSURE AND LOAD ATTACHING UNIT FOR BALLOONS AND THE LIKE
Original Filed July 12, 1949     2 Sheets-Sheet 2
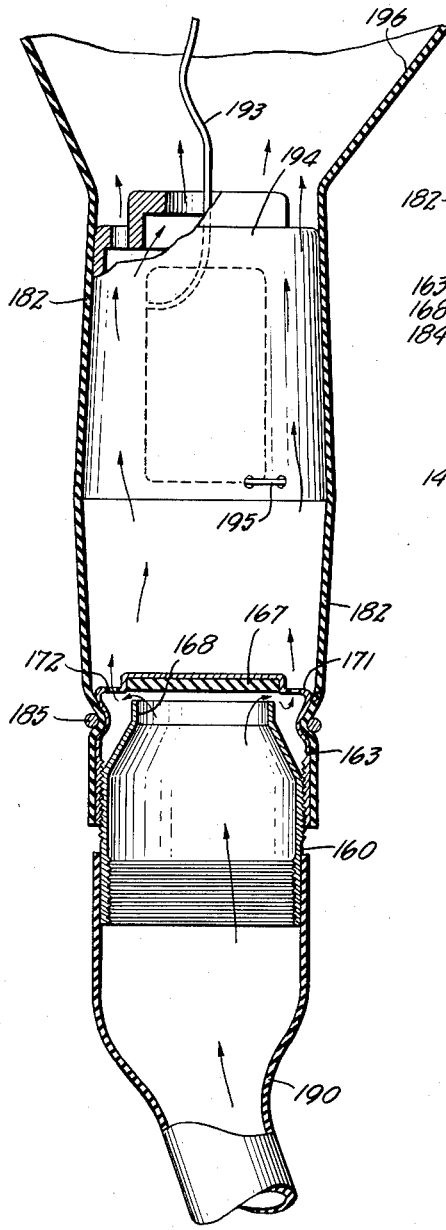
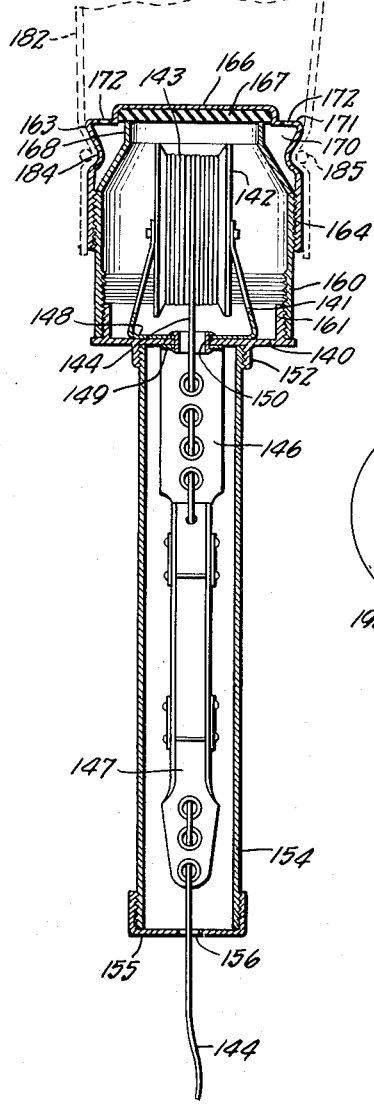
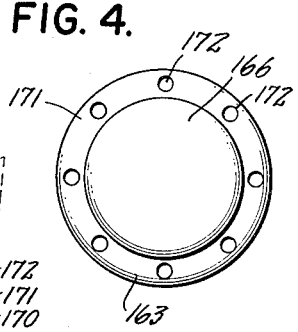
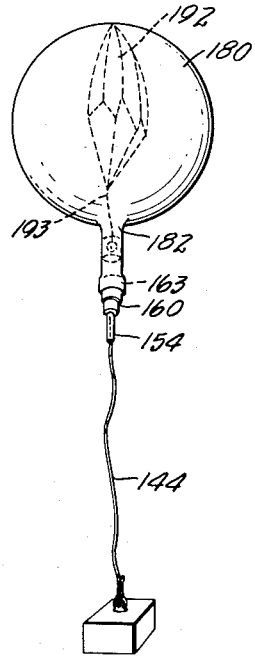
INVENTORS.
LEONARD P. FRIEDER
WALTER S. FINKEN
BY
ATTORNEY.

United States Patent Office 2,721,712
Patented Oct. 25, 1955

2,721,712

CLOSURE AND LOAD ATTACHING UNIT FOR BALLOONS AND THE LIKE

Leonard P. Frieder, Great Neck, and Walter S. Finken, Brooklyn, N. Y.; said Finken assignor to said Frieder Original application July 12, 1949, Serial No. 104,368, now Patent No. 2,680,577, dated June 8, 1954. Divided and this application July 8, 1953, Serial No. 366,702

4 Claims. (Cl. 244—32)

This invention relates to apparatus for connecting a load-supporting line to a balloon having a tubular neck. This application is a division of our copending application Serial No. 104,368, filed July 12, 1949, now U. S. Patent No. 2,680,577 of June 8, 1954, for Regulating and Control Apparatus for Load Supporting Means. There is disclosed and claimed in said copending application apparatus wherein the loaded line is payed out or extended in a controlled manner while under the tension of load-supporting or like force. The apparatus of the present invention is of especial utility in connection with such load controlling apparatus, although many features of the invention are of more general utility. An important example of circumstances wherein the apparatus of the invention is particularly useful, is presented by balloon-type equipment for aerial sounding, i. e. arrangements for carrying meteorological instruments by balloon for measuring conditions of pressure, temperature, humidity and other atmospheric effects. Such apparatus is usually carried aloft by a balloon of moderate dimensions, the instruments being arranged in a suitable assembly with appropriate means for recording the readings, and more usually, for transmitting the readings by radio to a ground station. Similar apparatus may be used for other purposes, indeed under any circumstances where automatic observation and signaling is required in aerial regions above the ground.

By way of more specific example, it has been found desirable to have the instruments suspended from the balloon by a relatively long load line, it being understood that an important reason for such arrangement of the load and balloon is to prevent certain interfering or disturbing effects on radio transmission or other radio signaling from the load when the balloon is close to the latter. Equipment of this sort, however, is commonly released at localities where a long load line is highly objectionable. Surrounding trees, buildings or like objects present a hazard to a long line from a slowly rising balloon in that the line or supported assembly of instruments is likely to be snagged or injured by such objects as the balloon rises upwardly and always somewhat laterally by reason of wind currents. Similar difficulties arise in the release of balloon-supported equipment from shipboard, where it is ordinarily impossible to release the balloon at any great distance from masts, funnels, radio antennas and the like which may snag a long line or its load or may damage the delicate instruments of the load if the latter strikes the stationary objects.

Accordingly, it is desirable to arrange the supporting apparatus so that at the time of release the load is held quite close to the balloon, but during ascent of the balloon, the load line is payed out slowly from a supply so that by the time the equipment reaches a height appropriate for initiation of signaling, the balloon or like support is positioned sufficiently remote from the load. Our aforesaid copending application describes and claims apparatus adapted for use under such circumstances, to effectuate a retarded extension of the line in a novel and yet fully controlled manner, over a period of time sufficient to permit the aerially borne assembly to rise clear of terrestrial interference.

An object of the present invention is to provide a novel arrangement for connection with a balloon, to provide closure for the latter and attachment of the load while preferably incorporating a regulated retardation of the load line.

Another object of the invention is to provide a closure for a balloon inlet, which may be used to attach the coupling of a gas supply conduit so as to fill the balloon, and which incorporates a valve to be closed before detaching the conduit.

A further object is to provide a balloon closure of the type described, which may be used to attach the balloon either to the coupling of a gas supply conduit or to a load supporting structure.

To these and other ends a specific embodiment of the invention is described below and shown in the accompanying drawings, by way of example which is believed to illustrate the significant principles and features of improvement.

Referring to the drawings:

Fig. 1 is a side elevation of one form of the apparatus for providing a retarded extension of a load line;

Fig. 2 is a like view of a portion of the device of Fig. 1 showing certain parts in a relaxed or opened position;

Fig. 3 is a view, chiefly in vertical section, of a combined apparatus for attachment to a balloon, including line-retarding structure and valve structure for the balloon;

Fig. 4 is a plan view of the device of Fig. 3;

Fig. 5 is a view, chiefly in vertical section, showing certain parts of the device of Fig. 3, and associated instrumentalities, in the course of original attachment to a balloon; and Fig. 6 is a schematic, perspective view showing the device of Figs. 3 and 4 in combination with the balloon and supported load, as in use.

While a variety of other uses are contemplated, it will be assumed for purposes of illustration, that the device (of Figs. 1 to 6, inclusive) shown is intended for incorporation in balloon-carried sounding equipment, e. g. so-called radiosonde apparatus. Such apparatus may comprise, as the load, an assembly of instruments designed to make meterological observations and to report the same automatically by radio as the instruments are carried and supported aloft by a balloon of suitable size, usually small, to reach the desired altitude. As explained, it is desirable to suspend the load very close to the balloon when the assembly is first released, but to have the load line pay out gradually so that when the apparatus reaches a selected height, say, one thousand feet or so, the load has dropped to a considerable distance below the balloon, for instance 50 to 100 feet or more. The rate of retardation of line pay out must be sufficiently slow as to permit no great elongation until after the assembly has cleared adjacent terrestrial objects, such as trees, buildings, cliffs, ship masts and the like.

The device of Figs. 1 and 2 is described in greater detail in our aforesaid copending application. For the purposes of the present invention, it may be described briefly as comprising a frame 30 consisting of spaced arms, one of which is shown at 32, providing bearings for a freely rotatable reel 34 upon which is wound a supply 35 of the cord or line 36, which extends, through the parts presently to be described, to a lower locality 36a and thence to the point of attachment to the load (Fig. 6). The upper parts of the arms 32 are bent over and secured together, as by a grommet 41, thereby affording an eye 42 to receive a loop 44 of suitable cord or the like by which the device may be fastened to suitable supporting connections (not shown) at the underside of the balloon.

Carried beneath the frame 30, a pair of parallel clamping members generally designated 50, 51 are arranged, in cooperation with other instrumentalities, to effect a retarding, frictional engagement with the line 36. Like the other member as described below, the member 51 comprises a channel portion 52 having a face or web 53 disposed to abut the cord and having an elongated tail or extension 54. The latter is conveniently secured, as by means of a horizontal tab 55, to the lower bend of the frame 30, which is conveniently made of a single bent metal strip. The tab 55 and frame part 56 can be united by a grommet 58, upset or deformed into clamping engagement of the parts, and providing an opening through which the cord 36 may be drawn from the reel.

The member 50 comprises a channel portion 62 having a cord-abutting face or web 63, like the corresponding structure of the member 51. The member 50 also has a tail or extended portion 64 similar to the portion 54, the two members being disposed so that the parts 54, 64, extend in vertically opposite directions. The channel portions 52, 62 of the two members are arranged with their surfaces 53, 63 in facing, parallel relation and are movably connected by appropriate linkage, such as the two sets of links 66, 67 each of which is pivoted, at its respective ends, on the sides of the channel portions 62, 52. By virtue of the described linkage, the members 50, 51 are maintained in a parallel relationship and may move toward and away from each other while keeping such relationship, so as to grip or release a cord passing lengthwise between them—Fig. 1 showing the parts in closely engaged position, and Fig. 2 illustrating them in open or released condition.

It will be seen that the members 50, 51 thus provide a pair of elongated, parallel surfaces 53, 63 between which the cord 36 passes and which are adapted to be urged toward each other in gripping relationship to the cord between. While other types of construction may be employed, these members may be inexpensively made of sheet metal strips having elongated side portions bent to constitute the channel parts, a further portion of each strip constituting the tail 54 or 64.

Means are also provided, not only for imparting force to the separable members 50, 51 to bring them together in frictional engagement upon the cord, but preferably also to afford cooperating frictional engagement with the cord to share the load-supporting and retarding action. A particularly convenient arrangement for the described purposes is constituted by a series of grommeted holes in each of the tail portions 54, 64, for example, a vertical array of spaced holes 70 in the upper tail portion 54 and a like array of holes 71 in the tail portion 64. In the device shown, there are four holes in each set but it will be understood that different numbers of such holes or like apertures may be provided, in accordance with the requirements of adjustability and of the extent of snubbing effect desired in a particular apparatus. At the toe or opposite end of each of the members 50, 51, there are provided in the web portions 63 grommeted holes respectively designated 72 and 73, which serve to cooperate with the other holes particularly to guide the cord down between the faces 53, 63 in proper alignment, preventing fouling or snagging of the cord by the linkage 66, 67 or otherwise.

For operation, the reel 34 is provided with a sufficient winding of cord to furnish the desired ultimate length of line between the balloon and the load, the inner end of the cord being secured to the shaft or core of the reel. From the reel 34, the cord is threaded through the grommeted hole 58, and preferably back-and-forth through two or more of the grommeted holes 70, thence through the hole 72 from the outside to the inner surface of the web 63 and down between the webs or faces 53, 63, as shown. At the lower end of the gripping surfaces the cord runs back through the hole 73 and then through one or more of the lower set of holes 71, to pass freely below the device, being connected at its remote end 38 to a load such as that illustrated in Fig. 6.

Thus it will be seen that the cord, discharged from the freely rotatable reel 34, is guided down between the channel members 52, 62, and specifically between their opposed faces 53, 63, and then through means associated with one of the members (i. e. the member 50, which is not attached to the upper frame 30) which engages the cord and serves to apply gripping force to the members, from the load-force under which the cord is tensioned in operation. The last-mentioned means, as explained, is constituted by the apertures 71 in the tail piece 64 of the member 50.

Assuming that a balloon is appropriately attached to the loop 44 and a load to the lower end 36a of the cord, and that substantially all of the cord is wound on the reel 34, with at most a very short length between the end of the device 50 and the load, the assembly may be released to travel upward under the lifting action of the balloon. The frictional engagement of the cord with the selected openings 71 transmits tension from the latter to the member 50, which by virtue of the linkage is thereby pulled downwardly and against the member 51, effecting a frictional grip on the portion of cord 36 between the faces 53, 63.

In this fashion tension is exerted between the supporting means, constituting the balloon, and the load, i. e. through the assembly of the frame 30 and member 51 attached thereto, and then via the cord 36 and member 50. The snubbing action of the selected apertures 71 on the cord provides a substantial frictional grip while permitting the cord to slide under the influence of the load; the structure not only retards such slippage but transfers load-force to the member 50 with the result that the latter is pulled down into gripping arrangement against the other member 51. The resulting clamping effect between the surfaces 53, 63 imparts substantial frictional resistance against the cord traveling between these members. The guiding of the cord between the members is facilitated by the threaded arrangement through the holes 72, 73, as well as by the direction of the cord through the holes 58 and 70. In addition, the weaving of the cord back and forth through the holes 70 contributes further snubbing or frictional retarding effect, in accordance with the selection of these holes.

In consequence the weight of the load is sufficient to draw the line slowly from the reel 34, but the retarding action of the described assembly particularly including the clamping effect of the members 53, 63, carries a substantial proportion of the load force and delays the advance of the line in the desired manner. The line therefore pays out, preferably very slowly, through the stated device, gradually lowering the load relative to the balloon 48, until the entire supply of cord on the reel 34 has been unwound. Thereafter, the upper end of the load line 36 is in effect directly connected to the balloon, so that the load depends at the desired, elongated position, remote from the balloon.

Figs. 3 to 6, inclusive, illustrate a complete closure and mounting device for a balloon, and cooperatively including means for retarded release of the load line, immediately associated with the mounting structure and in effect with the balloon itself. As shown in Fig. 3, this device includes a circular base member 140 carrying on its upper surface a yoke 141 constituting a bearing and support for the reel 142 on which is wound the supply 143 of the load line 144. An upper member 146 which cooperates with a lower member 147 to provide a pair of linked retarding members essentially the same as the elements 50 and 51 in Figs. 1 and 2, is also secured to the base element 140. Conveniently the transverse portion 148 of the yoke 141 and the horizontal flange 149 of the member 146 are held to the base 140 by a grommet or eyelet 150, compressed rivet-like in place as in the case of similar fastenings in other embodiments.

The base 140 has a depending skirt 152 which is internally threaded to receive the upper threaded end of a long cylindrical case 154 that encloses the members 146, 147 and is in turn closed at its lower end by a threaded cap 155, the cord 144 freely traversing an opening 156 in the cap. A generally cylindrical housing 160 is removably secured at the upper side of the base 140, for example by threaded engagement between the inner surface of the housing and the outer surface of a cylindrical flange 161 rising near the periphery of the member 140. A skirted cap 163 is displaceably secured over the upper end of the housing 160, e. g. by means of threads on the inner surface of the cap skirt cooperating at 164 with corresponding threads on an upper part of the housing 160.

The upper surface of the cap 163 is upwardly recessed over a central and considerable region at 166 to receive an inner, closure disk 167 of rubber or like compressible material, which can be firmly abutted on the upper edge of a neck portion 168, of reduced diameter, at the top of the housing 160, the latter device tapering upwardly to the neck portion 168 as shown, so that an annular space 170 is provided within the cap 163 and outside of the housing, i. e. beneath the outermost section 171 of the cap face. The cap portion 171 is apertured to afford free communication between the space 170 and the region above the cap, such apertures preferably consisting of a multiplicity of holes 172 spaced circumferentially around the region 171 as shown. By providing a plurality of such holes, danger of inadvertently closing one or another of them by the balloon fabric during the filling or other operation hereinbelow described is rendered of no consequence.

It will now be seen that the structure described constitutes a protective enclosure not only for the members 146, 147 but also for the reel 142 and its mounting, such enclosure being adapted as will now be described, for direct mounting within the structure of a balloon or the like and cooperating further to facilitate assembly and filling of the balloon at the time of use. As will be understood, a common type of balloon used for meteorological soundings and the like comprises a spherical body 180 (Fig. 6) of thin, elastic material such as rubber or a synthetic substance, having a tubular neck 182 strongly and integrally associated with the body of the balloon and customarily employed for filling the balloon with the desired, light gas. In ordinary practice heretofore, the filling connection is inserted in the mouth or neck 182, and after the balloon is filled, the neck is folded and flattened upon itself one or more times and finally tied, to prevent escape of gas.

As will be seen in Figs. 3, 5 and 6, the device including the cap 163 and housing 160, is adapted to be inserted snugly in the tubular neck 182 of the balloon, the cap 163 having a peripheral groove or corrugation 184 against which the tubular fabric 182 of the balloon may be pressed by an outer ring, tight cord, or other encircling member 185, i. e. so that the tube 182 is securely fastened, in sealed relation, to the outer surface of the skirt of the cap. As originally packed for storage, shipment and the like, the entire assembly may be secured together in the tube 182, e. g. as shown in Fig. 3. When it is desired to fill and use the balloon, the lower plate 140 is unscrewed from the housing member 160 and the retarding assembly carried by the plate is thus temporarily removed. The housing 160 itself is then partly unscrewed in the skirt of the cap 163, i. e. so that the upper edge of the neck 168 is backed away from and clear of the sealing disk 167, as shown in Fig. 5.

A flexible conduit 190 is pushed over the exposed end of the housing member 160, i. e. as shown in Fig. 5, so as to fit snugly thereon. The conduit 190 may extend to a source of suitable gas under pressure (not shown) from which it is desired to fill the balloon. Thereupon gas is supplied to the balloon, traveling in the path of the arrows, through the conduit 190, the housing 160 and the space between the mouth 168 and the sealing disk 167, the valve constituted by these parts being now open. Thence the gas travels through the annular chamber 170 and the openings 171 to the upper part of the tubular neck 182 and the interior of the balloon. When the balloon is filled to the desired extent and thus expanded in the manner intended, the supply of gas may be turned off (by means not shown) at the source. The member 160, conveniently grasped by holding the outer surface of the conduit 190, is turned sufficiently to screw it back into the cap 163 until the mouth 168 firmly and fully engages the sealing disk 167 in closed, gas-tight relation. With the valve thus closed, the conduit 190 may be removed and the supporting member 140 then reinserted in the lower opening of the housing 160, i. e. by screwing such member back tightly into place so that the reel 142 is again enclosed by the member 160 and the parts are securely associated together.

Desirable rapidity in the operation of filling the balloon and closing the valve is facilitated if the member 160 is originally backed away from the disk 167 by no more than enough to provide the desired inflow of gas through the valve structure, for example by unscrewing the member 160 four or five turns.

The balloon, by the few simple operations just described, is completely filled and sealed, while the attached load, together with the described line-receding structure, is securely fastened for carriage aloft by the balloon. No further operations are required with respect to the filling of the balloon or the connection, adjustment and setting of the load line. The balloon may thereupon be released, carrying the load upward as shown in Fig. 6, while the members 146, 147 immediately come into play to pay out the line at the appropriate slow rate as described in connection with Figs. 1 and 2.

It will be appreciated that other devices may be associated with the balloon as heretofore known, for example including a light, normally collapsed parachute 192 suspended within the balloon and having a load line 193 releasably collected in a cylindrical holder 194 mounted in the neck 182, above the assembly 160—163. The structure 194 includes, as shown, sufficient apertures at its upper and lower ends and corresponding passage space, so that the gas entering the balloon may travel freely through such structure. It will be understood that the remote end 195 of the collected cord 193 is secured to the device 194, the assembly being such that when and if the balloon 180 bursts at a high altitude, preferably in such manner as to sever the major part of the spherical balloon fabric from a portion 196 adjacent the neck 182, the parachute 192 will deploy, paying out its load line 193 as necessary and then supporting the device 194, the balloon neck 182 attached thereto and all of the structure also carried by the neck, including the retarding assembly as stated, the load line 144 and the load itself. Thus all of the balloon-carried parts, particularly including the valuable instruments constituting the load, may be brought slowly and safely to earth by the parachute.

It will be seen that the structure illustrated in Figs. 3 to 6 thus constitutes a peculiarly advantageous combination of cooperating elements for mounting the load line device in the neck of the balloon and for facilitating filling and assembly of the balloon at the time of use. The several housing and supporting elements 160, 163, 154 and the like may be of simple and inexpensive construction, being made of relatively thin aluminum or like metal, spun, pressed or otherwise formed to the described shapes.

It is to be understood that the invention is not limited to the specific instructures herein shown and described but may be embodied in other forms without departure from its spirit.

We claim:

1. Apparatus for connecting a load line with a balloon which has a tubular neck, comprising a skirted cap adapted to be secured in the neck of the balloon, a housing member displaceably fitted in said cap and having a mouth portion, within the cap, of reduced diameter, said cap including means to be abutted by said mouth portion to constitute an upper closure for the housing member, said housing member being spaced inwardly of the cap at regions adjacent said mouth portion to provide an annular chamber between the cap and housing, and said cap being apertured for communication between the said chamber and the space above the cap in the balloon neck, closure means removably secured at the end of the housing opposite to its said mouth portion, and carrying a reel of load line to be thereby enclosed by the housing, frictional retarding means carried by said closure means at the outer side thereof, said closure means including an aperture for traversal by the load line from the reel to said retarding means, and said retarding means being adapted to engage the line intermediate the closure means and the remote end of the line, for frictionally retarding advance of the line from the reel.

2. In apparatus of the character described, in combination, a tubular housing member open at both ends, a cap member displaceably engaged over one end of said housing member and adapted to be secured in a tubular neck of an inflatable device, said housing member and cap member constituting valve means adapted to be closed upon predetermined mutual displacement to prevent communication between the housing and the space in the aforesaid tubular neck, mounting means removably engaging the opposite end of the housing member and carrying a reel of load line thereby enclosed in the housing member, said mounting means being removable from the housing member to permit attachment to the latter of a gas supply conduit to furnish gas under pressure into the tubular neck when the aforesaid valve means is open, and line-retarding means carried by the said mounting means for frictionally retarding the load line when it is drawn from the reel under load.

3. In apparatus of the character described, housing means comprising separable elements, load line supply means mounted on one of said elements to be enclosed by the elements when the latter are engaged, a pair of parallel gripping members linked to move against the load line upon application of load force to a first of said members relative to the second of them, said second member being mounted to the aforesaid reel-carrying element and the first of said members including means frictionally engaging the load line or ftransmitting load force to urge the members together, said members being adapted to receive the aforesaid load line between them intermediate the supply means and the remote end of the line, which may be connected to the load, the other element of said housing means having associated closure means and being adapted therewith for insertion in a tubular neck of an inflatable device, said other element and closure means being mutually displaceable and thereby constituting a valve which may be opened to admit gas to the inflatable device through said tubular neck.

4. Apparatus for connecting a load line with a balloon having a tubular neck, comprising a tubular cap member receivable in said neck, means for attaching said cap member to said neck, said cap member being apertured to permit flow of gas therethrough, a valve seat integral with and inside said cap member, a tubular housing member threadedly inserted in said cap member, said housing member having a valve portion adapted to cooperate with said seat, a base member having a tubular flange threadedly insertable in said housing member, and a reel of load line mounted on said base member within said flange, said housing and base members cooperating when said flange is threaded in said housing member, to enclose and support said reel of load line.

References Cited in the file of this patent

UNITED STATES PATENTS

| | | |
|---|---|---|
| 678,792 | Girardville | July 16, 1901 |
| 2,409,166 | Tracy | Oct. 8, 1946 |
| 2,444,642 | Frieder | July 6, 1948 |
| 2,560,637 | Doolittle | July 17, 1951 |
| 2,578,753 | Smith | Dec. 18, 1951 |